US008889249B2

(12) United States Patent
Vast et al.

(10) Patent No.: US 8,889,249 B2
(45) Date of Patent: Nov. 18, 2014

(54) SECURITY DEVICE AND SECURITY SUPPORT COMPRISING SAME

(75) Inventors: Nathalie Vast, Mont Saint Eloi (FR); Matthias Muller, Bechtsrieth (DE); Friedrich Kastner, Grieskirchen (AT)

(73) Assignee: Arjowiggins Security, Issy les Moulineaux (FR)

( * ) Notice: Subject to any disclaimer, the term of this patent is extended or adjusted under 35 U.S.C. 154(b) by 1305 days.

(21) Appl. No.: 11/718,134

(22) PCT Filed: Oct. 28, 2005

(86) PCT No.: PCT/IB2005/053536
§ 371 (c)(1),
(2), (4) Date: Jan. 15, 2008

(87) PCT Pub. No.: WO2006/046216
PCT Pub. Date: May 4, 2006

(65) Prior Publication Data

US 2008/0246272 A1 Oct. 9, 2008

(30) Foreign Application Priority Data

Oct. 29, 2004 (EP) .................................... 04292580

(51) Int. Cl.
*B32B 3/00* (2006.01)
*B42D 15/00* (2006.01)

(52) U.S. Cl.
CPC .................................. *B42D 15/0026* (2013.01)
USPC ........................... 428/204; 428/195.1; 283/94

(58) Field of Classification Search
USPC ........................... 428/195.1; 283/94; 359/883
See application file for complete search history.

(56) References Cited

U.S. PATENT DOCUMENTS

| | | | | |
|---|---|---|---|---|
| 4,462,866 A | | 7/1984 | Tooth et al. | |
| 4,629,647 A | | 12/1986 | Sander | |
| 5,310,222 A | | 5/1994 | Chatwin et al. | |
| 5,388,862 A | * | 2/1995 | Edwards | 283/82 |
| 6,082,778 A | * | 7/2000 | Solmsdorf | 283/82 |

(Continued)

FOREIGN PATENT DOCUMENTS

| | | |
|---|---|---|
| DE | 296 22 700 U1 | 6/1997 |
| DE | 296 22 700 U | 7/1997 |

(Continued)

OTHER PUBLICATIONS

International Search Report in PCT/IB2005/053536 having a mailing date of Aug. 4, 2006.

(Continued)

*Primary Examiner* — David Sample
*Assistant Examiner* — Laura C Powers
(74) *Attorney, Agent, or Firm* — Jones Robb, PLLC

(57) ABSTRACT

The invention relates to a security device comprising a security element composed of:

a carrier substrate (1) provided with at least one optically variable effects generating structure (2) situated in defined areas of the said carrier, a first reflective layer (3) visible at least where it coincides with the said optically variable effects generating structures (2) and comprising a reflection enhancing material, at least one second distinctive reflective layer (4) situated only outside the optically variable effects generating structures (2) and comprising a reflective material different from that of the first layer (3).

These layers (3,4) can comprise further patterns (7).

The invention relates to a security support (9) or document comprising the said security device too.

30 Claims, 2 Drawing Sheets

(56) References Cited

U.S. PATENT DOCUMENTS

| | | | | |
|---|---|---|---|---|
| 2004/0100707 | A1* | 5/2004 | Kay et al. | 359/883 |
| 2005/0012326 | A1 | 1/2005 | Keller et al. | |
| 2005/0127663 | A1 | 6/2005 | Heim | |
| 2005/0141094 | A1* | 6/2005 | Wild et al. | 359/586 |
| 2005/0181498 | A1 | 8/2005 | Lutz et al. | |
| 2006/0249042 | A1 | 11/2006 | Heim et al. | |

FOREIGN PATENT DOCUMENTS

| | | | |
|---|---|---|---|
| EP | 0 059 056 | A1 | 9/1982 |
| EP | 0 170 832 | A1 | 6/1985 |
| EP | 0 400 902 | A2 | 12/1990 |
| EP | 0 496 180 | A2 | 7/1992 |
| EP | 1 327 531 | A1 | 7/2003 |
| WO | WO 91/06925 | A1 | 5/1991 |
| WO | WO 92/16378 | A1 | 10/1992 |
| WO | WO 99/54842 | | 10/1999 |
| WO | WO 01/03945 | A1 | 1/2001 |
| WO | WO 01/57832 | A1 | 8/2001 |
| WO | WO 01/68383 | A1 | 9/2001 |
| WO | WO 02/00445 | A1 | 1/2002 |
| WO | WO 02/00446 | A1 | 1/2002 |
| WO | WO 0200446 | A1 * | 1/2002 |
| WO | WO 03/053714 | A1 | 7/2003 |
| WO | WO 03/068525 | A1 | 8/2003 |
| WO | WO 03/091042 | A2 | 11/2003 |
| WO | WO 03/095225 | A1 | 11/2003 |
| WO | WO 03/095228 | A1 | 11/2003 |
| WO | WO 03095228 | A1 * | 11/2003 |
| WO | WO 2004/030928 | A1 | 4/2004 |

OTHER PUBLICATIONS

Written Opinion of the International Searching Authority in PCT/IB2005/053536.

Third Party Opposition to European Patent No. EP 1 809 486 B1 from De La Rue International Limited.

Third Party Opposition to European Patent No. EP 1 809 486 B1 from Leonhard Kurz Stiftung & Co.

Third Party Opposition to European Patent No. EP 1 809 486 B1 from Giesecke & Devrient GMBH.

Third Party Opposition to European Patent No. EP 1 809 486 B1 from Leonhard Kurz Stiftung & Co.: Optical Character Recognition from pdf file to Word file , primary language: German.

Third Party Opposition to European Patent No. EP 1 809 486 B1 from Leonhard Kurz Stiftung & Co.: machine translation through Google Translate of Word file (cite No. 1) converted through Optical Character Recognition from pdf file.

Third Party Opposition to European Patent No. EP 1 809 486 B1 from Giesecke & Devrient GMBH: Optical Character Recognition from pdf file to Word file , primary language: German and machine translation through Google Translate of Word file converted through Optical Character Recognition from pdf file.

Third Party Opposition to European Patent No. EP 1 809 486 B1 from Leonhard Kurz Stiftung & Co.: Optical Character Recognition from pdf file to Word file , primary language: German and machine translation through Google Translate of Word file converted through Optical Character Recognition from pdf file.

Third Party Opposition to European Patent No. EP 1 809 486 B1 from Giesecke & Devrient GMBH: Optical Character Recognition from pdf file to Word file, primary language: German and machine translation through Google Translate of Word file converted through Optical Character Recognition from pdf file.

* cited by examiner

SECURITY DEVICE AND SECURITY SUPPORT COMPRISING SAME

CROSS-REFERENCE TO RELATED APPLICATIONS

This is a national stage application of International Application No. PCT/IB2005/053536, filed internationally on Oct. 28, 2005, and incorporated herein by reference.

TECHNICAL FIELD

The invention relates to a security device comprising a security element comprising optically variable effects (OVE) generating structure(s) and at least two distinctive reflective visible parts to improve its security function against counterfeiting.

The invention relates to a security support or document comprising the said security device or element too.

BACKGROUND

Security supports comprising at least one security element such as a security thread or stripe or patch are well known for making security documents in particular valuable documents such banknotes, cheques, vouchers or identity papers/cards.

Optically variable effects generating structures are widely known and used as security features. These structures are commonly formed as relief structures, reflection structures, reflection gratings, holographic structures, and the like, in a substrate, which is then provided with a reflective coating, for example a continuous or partial metallic layer to enhance the optically variable effect.

The most often security elements comprising these structures, which are in form of a patch or stripe, are then adhered to a support for making the article or document which is to be secured. Alternatively, the security element can be a thread partially embedded in the support, the optically variable effects being visible in a window.

WO 02/00446 discloses a security device comprising a substrate formed with a surface relief defining an optically variable effect generating structure and at least two different reflection enhancing materials, which are provided on, or on the same side of the substrate with respect to, the surface relief. The optically variable effect can be viewed against a background defined by the reflection enhancing materials.

These security devices display optically variable effects which have their diffraction spectrum spatially modulated by the reflective hue of the underlying metallic pattern. This metallic pattern is formed by two different metallic layers and cannot be easily matched by dyeing or colouring material layers.

SUMMARY

It is one object of the invention to provide a security device and consequently a security support respectively a security document or article with security elements having an enhanced first level security feature which is easily observable and recognised by the public.

These security elements may optionally have an enhanced second level security features which is detectable by a portative and small apparatus/device and third level security features i.e. detectable by a sophisticated apparatus/device.

Object of the invention is therefore a security device comprising a security element composed of:

- a carrier substrate (1) provided with at least one optically variable effects generating structure (2) situated in a defined area of the said carrier,
- a first reflective layer (3) visible at least where it coincides with the said optically variable effects generating structure (2) and comprising a reflection enhancing material,
- at least one second distinctive reflective layer (4) visible only outside the optically variable effects generating structure (2) and comprising a reflective material different from that of the first layer (3).

Suitable as a carrier substrate (1) according to the invention are, for example, carrier films, preferably flexible plastics films, for example of PI, PP, MOPP, PE, PPS, PEEK, PEK, PEI, PSU, PAEK, LCP, PEN, PBT, PET, PA, PC, COC, POM, ABS, PVC. The carrier films preferably have a thickness of 5-700 μm, preferably 5-200 μm, particularly preferably 5-50 μm.

Besides, paper or composites with paper, for example, paper/plastic composites with a grammage of 20-500 $g/m^2$, preferably 40-200 $g/m^2$, can be used as carrier substrates.

Moreover, fabrics or nonwovens, such as endless fibre nonwovens, staple fibre nonwovens and the like, which may possibly be needled or calendered, can be used as carrier substrates. Such fabrics or nonwovens preferably consist of plastics, such as PP, PET, PA, PPS and the like, but fabrics or nonwovens of natural, possibly treated fibres, such as viscose fibre nonwovens, can also be used. The fabrics or nonwovens used have a grammage of about 20 $g/m^2$ to 500 $g/m^2$. If appropriate, the fabrics or nonwovens can be surface-treated.

The structure (2) defining an optically variable effect may be a surface relief, a holographic structure, for example a holographic image generating microstructure, a diffraction grating or a diffraction pattern, a reflection grating or a reflection pattern.

In the case of the security element comprises several structures (2) defining an optically variable effect, these structures have a defined extension and are spaced apart and they may be different or identical, preferably they form repeating patterns.

The reflective layer (3) enhances the optically variable effect of the structure (2), so it can be qualified as a reflection enhancing layer.

The layer (3) is applied directly on or below the structure (2) defining the optically variable effect or may be applied on the opposite side of the carrier substrate with respect to said structure.

The reflection enhancing layer (3) may be made of a material selected from the group of metal or metallic layers, metallic inks, high reflective index layers such as layer of ZnS.

Appropriate metal or metallic layers or inks are preferably layers comprising at least one of the following compounds: aluminium, copper, tin, chromium, silver, gold, nickel, or appropriate alloys, such as stainless steel, Cr/Ni or the like. They also can comprise a compound selected among Zn, Cd, Bi, TiO2, Cr oxides, ZnS, ITO, Bi oxide, ATO, FTO, ZnO, Al2O3, Zn chromate, Fe oxides, CuO, Cu—Al alloys, Cu—Zn alloys, iron alloys, steel, colour pigments, azurite or malachite and the like.

The reflection enhancing layer (3) may be a continuous or a partial layer. In a particular embodiment of the invention, this layer (3) defines recesses and/or deposits in the form of patterns. Patterns can be signs, indicia, characters, symbols, lines and the like. Further the reflection enhancing layer (3) may be laid down in dots.

In a particular embodiment, the reflection enhancing layer (3) covers the structure (2) defining an optically variable effect only partially.

In a particular embodiment, the layer (4) is visible around the area of the structure (2) generating an optically variable effect.

In another particular embodiment, the carrier substrate (1) is provided with several optically variable effects generating structures (2) situated in respective defined areas of the said carrier and the layer (4) is visible in the spaces between the said defined areas of the structures (2).

In another particular embodiment, the layer (4) is situated only outside the said structure (2).

This second layer (4) may be made of a reflective material as those described for layer (3).

In a particular embodiment, these layers (3,4) may be made of a metal or metallic layer coated or printed with coloured ink.

This second layer (4) may be laid down in the form of pattern(s) defining recesses and/or deposits. Patterns can be characters, symbols, lines, indicia, signs and the like. Further the second reflection layer (4) may be laid down in dots in register with the first reflection enhancing layer (3).

The layers (3,4) of the said security element may also be in the form of detection antennas of electronic chips.

Both layers (3,4) may be produced by known deposition or printing techniques such as offset printing, offset lithography, gravure printing, intaglio gravure printing seamless and sheet fed, intaglio printing, screen printing flexo printing, digital printing, physical vapour deposition (PVD), chemical vapour deposition (CVD) or sputtering processes.

Both layers (3,4) comprising metals or metal compounds or alloys may be produced by selective metallisation or by known metallisation/demetallisation processes. Thus a second optical effect is generated in the spaces between and/or around the structures (2) generating an optically variable effect due to different colours of the metals.

In the spaces between and/or around the structures (2) generating an optically variable effect the layers (3,4) may be laid down one on the other in some area. Advantageously they may be spaced apart by one or more intermediate layer(s), which is (are) preferably transparent. The intermediate layer may comprise a dielectric, thus the layer may be laid down in a pattern forming a RF resonant circuit.

Furthermore, an electrically conductive polymer layer can also be applied as the electrically conductive layer or intermediate layer. The electrically conductive polymers can be, for example, polyaniline or polyethylene dioxythiophene or derivatives thereof.

Further the substrate carrier (1) may be provided with positive and/or negative features in the form of patterns (characters, symbols, signs, indicia, bar codes and the like) to give an additional information or security feature, these features being made by printing or by a process of selective metallisation or a process of metallisation/demetallisation.

The optical appearance of said features can be completed by using visible dyestuffs or pigments, luminescent dyestuffs or pigments which fluoresce or phosphoresce in the visible, in the UV range or in the IR range, effect pigments, such as liquid crystals, pearl lustre, bronzes and/or multilayer colour-change pigments and/or thermochromic colours or pigments. These can be employed in all possible combinations. In addition, phosphorescent pigments can also be employed on their own or in combination with other dyestuffs and/or pigments. Further layers having magnetic properties may be associated with the security element. Suitable inks or varnishes having magnetic properties are magnetic-pigment inks with pigments based on Fe oxides, such as $Fe_2O_3$ or $Fe_3O_4$, iron, nickel, cobalt and their alloys, cobalt/samarium, barium-ferrites or cobalt-ferrites, hard and soft magnetic steel grades in aqueous or solvent-containing dispersions. Suitable solvents are, for example, i-propanol, ethyl acetate, methyl ethyl ketone, methoxypropanol, aliphatics or aromatics and their mixtures.

The pigments are preferably introduced into acrylate polymer dispersions with a molecular weight of 150 000 to 300 000, in acrylate-urethane dispersions, acrylate-containing, styrene-containing or PVC-containing dispersions or in solvent-containing such dispersions.

Particularly suitable are magnetic inks with pigments based on Cr/Ni steel, Al/$Fe_3O_4$ and the like. These magnetic inks, as opposed to the conventional magnetic inks, which appear black, brown or grey, exhibit a silvery appearance and, at the same time, exhibit the above-described required magnetic properties. This makes it possible to produce the metallically glossy appearance, desired or required for many applications, in one operation merely by printing these magnetic inks. Overprinting or coating with metallic or metal layers in order to produce the desired appearance is therefore not needed, but can be carried out without difficulty, for example in order to introduce further identification features.

The magnetic layers may be provided in coded or not coded form as patches or stripes or the like.

The carrier substrate (1) can, additionally have a protective varnish or ink layer, which can be unstructured or structured. The varnish layer can be, for example, a transfer varnish layer which is capable of release, it can be cross-linked or cross-linkable by radiation, for example UV radiation, and can be finished so as to be scratch-resistant and/or antistatic. Both aqueous and solid varnish systems are suitable, in particular varnish systems based on polyester-acrylate or epoxy acrylate, or colophonium, acrylate, alkyd, melamine, PVA, PVC, isocyanate, urethane systems, which can be conventionally or reactively curing (mixture or radiation-curing).

These varnish layers can be pigmented or non-pigmented. The pigment used can be chosen among all known pigments, such as titanium dioxide, zinc sulphide, kaolin, ITO, ATO, FTO, aluminium, chromium and silicon oxide and also coloured pigments. Here, varnish systems containing solvent and also systems without solvent can be used.

Various natural or synthetic binders are suitable as binders.

Furthermore, the said security element can be provided with a hot-melt or a cold-seal adhesive or a self-adhesive coating for application to the security support. The adhesive can be a pigmented adhesive. It is also possible to laminate the security element to a further carrier substrate which, if appropriate, has further functional layers and/or decorative layers.

The invention is also related to a security support comprising the said security device or security element.

The security device or element may be at least partially embedded into said security support or at least partially applied thereon.

In a particular embodiment of the invention, the security device or element is a thread partially embedded in the said support, the visible parts of the layers (3) and (4) appearing in at least one window. This thread can be embedded with a window in a paper support according to the process describes in the patent EP59056. It could be also embedded between two fibrous or film layers comprising window(s).

In another particular embodiment of the invention, the security device or element is a patch or stripe applied to the said security support.

The security support according to the invention can be made basically of fibrous material such as cellulose and/or cotton and/or synthetic fibres. In particular, the support is a paper or a nonwoven.

The security support according to the invention can also be made basically of a plastic film (or plastic sheet) or of a laminate of plastic films or of laminate of at least one fibrous material web and one plastic film.

The plastic film can be a synthetic paper, for example a film Polyart® made by the company ARJOBEX Ltd.

The security support can comprise also at least one electronic chip that is possibly detectable from a distance, the integrated circuit of which is a silicon base or a polymer base as disclosed in patent application WO 99/54842.

The security devices according to the invention, if required further appropriate tailoring (for example to form threads, ribbons, stripes, patches or other formats), are therefore used as security features in data supports, in particular valuable documents such as identity papers, cards, banknotes or labels, seals and the like, but also in packaging materials for sensitive goods, such as pharmaceuticals, foodstuffs, cosmetics, data carriers, electronic components and the like. Furthermore, the security devices or elements can be applied to packaging materials for an extremely wide range of goods, for example to films, blister foils, paper, boxes, cartons and the like.

The invention is also related to a security document or article comprising the said security device or element or security support. Security documents are valuable/identity documents such as banknotes, cheques, bonds, share certificates, vouchers, data carriers, cards in particular identity cards, visas, passports, licences, brand authentication labels, tamper evidence labels, legal documents and the like. Security article can be packaging material for pharmaceutical, electronics and/or foodstuffs industry, for example in the form of blister films, folding boxes, covers, film packs.

BRIEF DESCRIPTION OF THE DRAWINGS

Some examples of security device according to the invention will now be described with reference to the FIGS. 1 to 3, not in proportional scale for clarity of figures.

DETAILED DESCRIPTION

Figure 1:
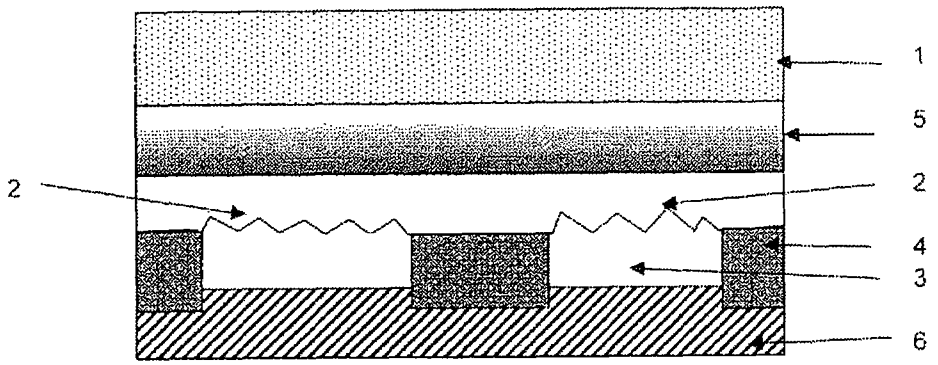
FIG. 1 is a schematic, cross-section through one example of a security device for making a hot stamping security stripe.

The security device of FIG. 1 comprises:

- a carrier 1 which will be peeled away when the complete structure (layers 6,3,4,2) is applied on the security support or document,
- a release layer 5,
- onto one surface which has been partially embossed with an optically variable microstructure 2 generating an holographic effect. This surface layer is vacuum coated with a metal layer 3 (Aluminium for instance), typically 20-100 nm thickness, which is then partially demetallised exactly in the parts which are not optically variable in a design pattern to render it transparent;
- these demetallised parts of layer 3 are then treated with a thicker layer of metal 4 (copper for instance or any other metal or alloy different from metal of layer 3), typically 40-200 nm thickness,
- a hot-melt adhesive layer 6, typically 0.5-20 μm thickness.

Figure 2:
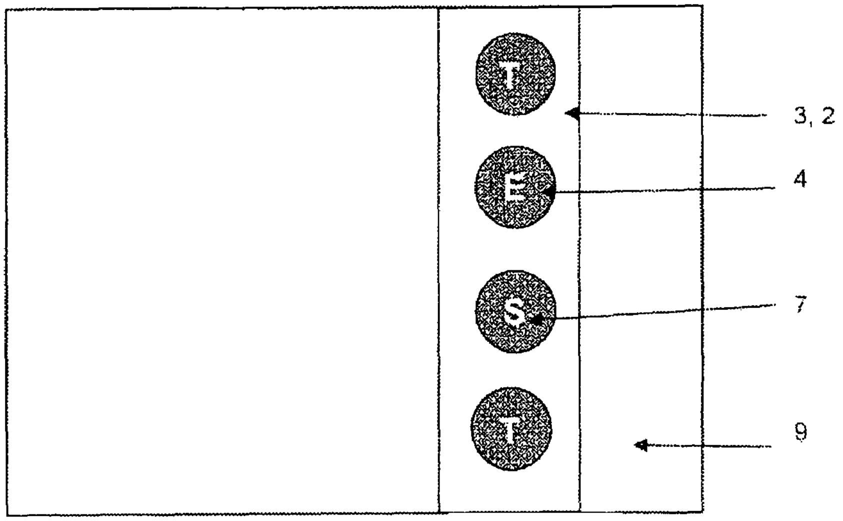
FIG. 2 is a plan view of a security support carrying a security device according to the invention.

A variety of different types of security feature can be created with addition of dielectric layer, fluorescent materials, organic/inorganic coating(s), FIG. 2 illustrates a security stripe having a similar structure of the device of FIG. 1 but combined with demetallisations 7, this stripe being applied on a security paper support 9.

The stripe comprises:

- parts made of metal layer 4 (Copper for instance) but comprising no optically variable structure; each part being combined with a fine demetallised pattern 7;
- parts of metal layer 3 (Aluminium for instance) which comprise optically variably embossed structures 2. Alternatively, these parts can also comprise a demetallised pattern.

Figure 3:
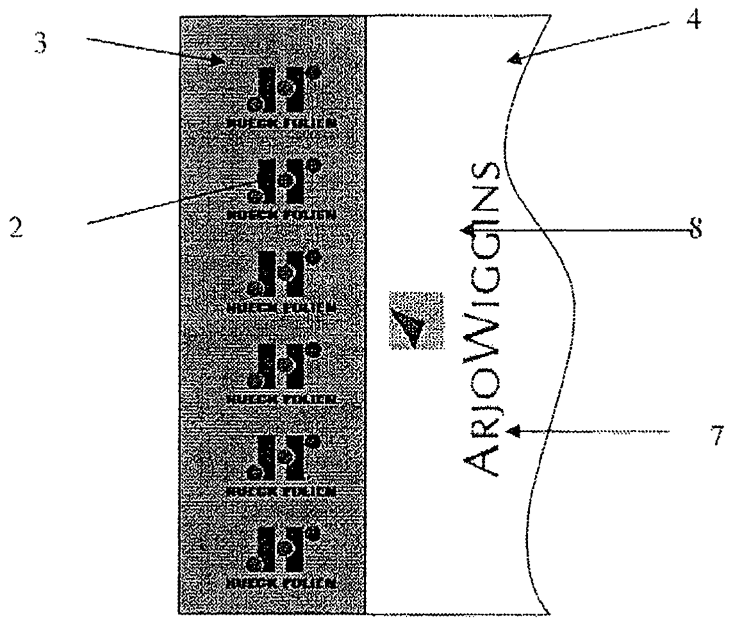
FIG. 3 is a plan view of another example of a security device according to the invention.

FIG. 3 illustrates another possible combination, a security patch having a width of 15 mm and:

- an optically variable structure 2 which is a stereogram
- a copper layer as enhancing layer 3,
- an aluminium layer as reflective layer 4 outside the structure 2, this layer 4 comprising a demetallised text 7 and a positive printed pattern 8 with a magnetic patch background.

The invention claimed is:

1. A security device comprising a security element comprising:

- a substrate provided with at least one optically variable effects generating structure situated in a defined area of the substrate, the optically variable effects generating structure being a holographic structure or a diffraction grating;
- a first reflective layer visible at least where the first reflective layer coincides with the at least one optically variable effects generating structure, the first reflective layer comprising a reflection enhancing material being a metal or an alloy; and
- at least one second distinctive reflective layer located directly on the substrate where the at least one optically variable effects generating structure is not present and visible only through regions of the substrate where the at least one optically variable effects generating structure is not present, the at least one second reflective layer comprising a reflective material different from that of the first reflective layer chosen from a metal, an alloy, and a metallic ink;
- wherein the first and second reflective layers have different colors from each other to generate an optical effect.

2. The security device of claim 1, wherein the at least one optically variable effects generating structure is a surface relief structure.

3. The security device of claim 1, wherein the first reflective layer covers only partially the at least one optically variable effects generating structure.

4. The security device of claim 1, wherein the at least one second reflective layer is visible around the defined area of the at least one optically variable effects generating structure.

5. The security device of claim 1, wherein the substrate is provided with several optically variable effects generating structures situated in respective defined areas of the carrier substrate and the at least one second reflective layer is visible only through regions of the substrate between the defined areas of the optically variable effects generating structures.

6. The security device of claim 1, wherein the at least one second reflective layer is situated such that the at least one second reflective layer is not coincident with the said at least one optically variable effects generating structure.

7. The security device of claim 1, wherein at least one of the first and second reflective layers comprises at least one of recesses and deposits defining patterns.

8. The security device of claim 1, wherein the reflection enhancing material of the first reflective layer is chosen from Al, Cu, Fe, Ag, Au, Cr, Ni, Zn, Cd, Bi, Cu—Al alloys, Cu—Zn alloys, iron alloys, and steel.

9. The security device of claim 1, wherein the first and the second reflective layers are laid down one on the other in some areas and separated by at least one intermediate layer in these areas.

10. The security device of claim 9, wherein the at least one intermediate layer comprises a dielectric material.

11. The security device of claim 1, wherein the security element further comprises at least one of positive and negative patterns.

12. The security device of claim 1, wherein the security element comprises partial or continuous layers with at least one of electrical and magnetic properties.

13. The security device of claim 1, wherein the security element is provided with a protective varnish layer on at least one of its sides.

14. The security device of claim 13, wherein the protective varnish layer is pigmented.

15. The security device of claim 1, wherein the security element is laminated to at least one carrier substrate which has at least one of a functional layer and a decorative layer.

16. The security device of claim 1, wherein the security device comprises a laminating adhesive.

17. The security device of claim 16, wherein the laminating adhesive is chosen from a hot-melt adhesive, a cold-seal adhesive, and a self-adhesive.

18. The security device of claim 16, wherein the laminating adhesive is present at least partially in the area or in a structured manner of the security element.

19. A security document or article comprising the at least one security device according to claim 1.

20. The security document or article of claim 19, wherein the security device comprises a thread which is at least partially embedded in the security document or article, the visible parts of the first and second layers appearing in at least one window.

21. The security document or article of claim 19, wherein the security device comprises a patch or a stripe applied at least partially to at least one surface of the security document or article.

22. The security document or article of claim 19, wherein the security document or article is made of fibrous material.

23. The security document or article of claim 19, wherein the security document or article is made substantially from one of a plastic film, a composite of plastic films, or a composite of at least one fibrous material and a plastic film.

24. The security document or article of claim 19, wherein the security document or article is chosen from identity cards, visas, passports, banknotes, authentication brand labels, tamper evidence labels, seals, and packaging materials.

25. The security device of claim 16, wherein the laminating adhesive comprises a pigmented adhesive.

26. The security document or article of claim 22, wherein the fibrous material is chosen from at least one of cellulose, cotton, and synthetic fibers.

27. The security document or article of claim 24, wherein the security document or article is chosen from packaging materials comprising packaging materials for at least one of pharmaceuticals, electronics, foodstuff, cosmetics, and data carriers.

28. The security device of claim 1, wherein the reflective material of the second reflective layer is chosen from Al, Cu, Fe, Ag, Au, Cr, Ni, Zn, Cd, Bi, Cu—Al alloys, Cu—Zn alloys, iron alloys, and steel.

29. A security device comprising a security element comprising:

- a substrate provided with at least one optically variable effects generating structure situated in a defined area of the substrate, the optically variable effects generating structure being a holographic structure or a diffraction grating;
- a first reflective layer visible at least where the first reflective layer coincides with the at least one optically variable effects generating structure, the first reflective layer comprising a reflection enhancing material that is a metal or an alloy; and
- at least one second distinctive reflective layer located directly on the substrate where the at least one optically variable effects generating structure is not present and visible only through regions of the substrate where the at least one optically variable effects generating structure is not present, wherein the at least one second reflective layer comprises a reflective material different from that of the first reflective layer, and wherein the at least one second reflective layer is a metallic ink.

30. A security device comprising a security element comprising:

- a substrate provided with at least one optically variable effects generating structure situated in a defined area of the substrate,
- a first reflective layer visible at least where the first reflective layer coincides with the at least one optically variable effects generating structure, the first reflective layer comprising a reflection enhancing material that is a metal or an alloy, and
- at least one second distinctive reflective layer located directly on the substrate where the at least one optically variable effects generating structure is not present and visible only through regions of the substrate where the at least one optically variable effects generating structure is not present, the at least one second reflective layer comprising a reflective material different from that of the first reflective layer, the reflective material of the at least one second reflective layer being a metal or an alloy;
- wherein the first and second reflective layers have different colors to generate an optical effect, the first and second reflective layers being produced by physical vapor deposition (PVD) or chemical vapor deposition (CVD).

* * * * *